(No Model.)
C. B. CHURCHILL & J. BENSON.
GARDEN IMPLEMENT.
No. 306,058. Patented Oct. 7, 1884.
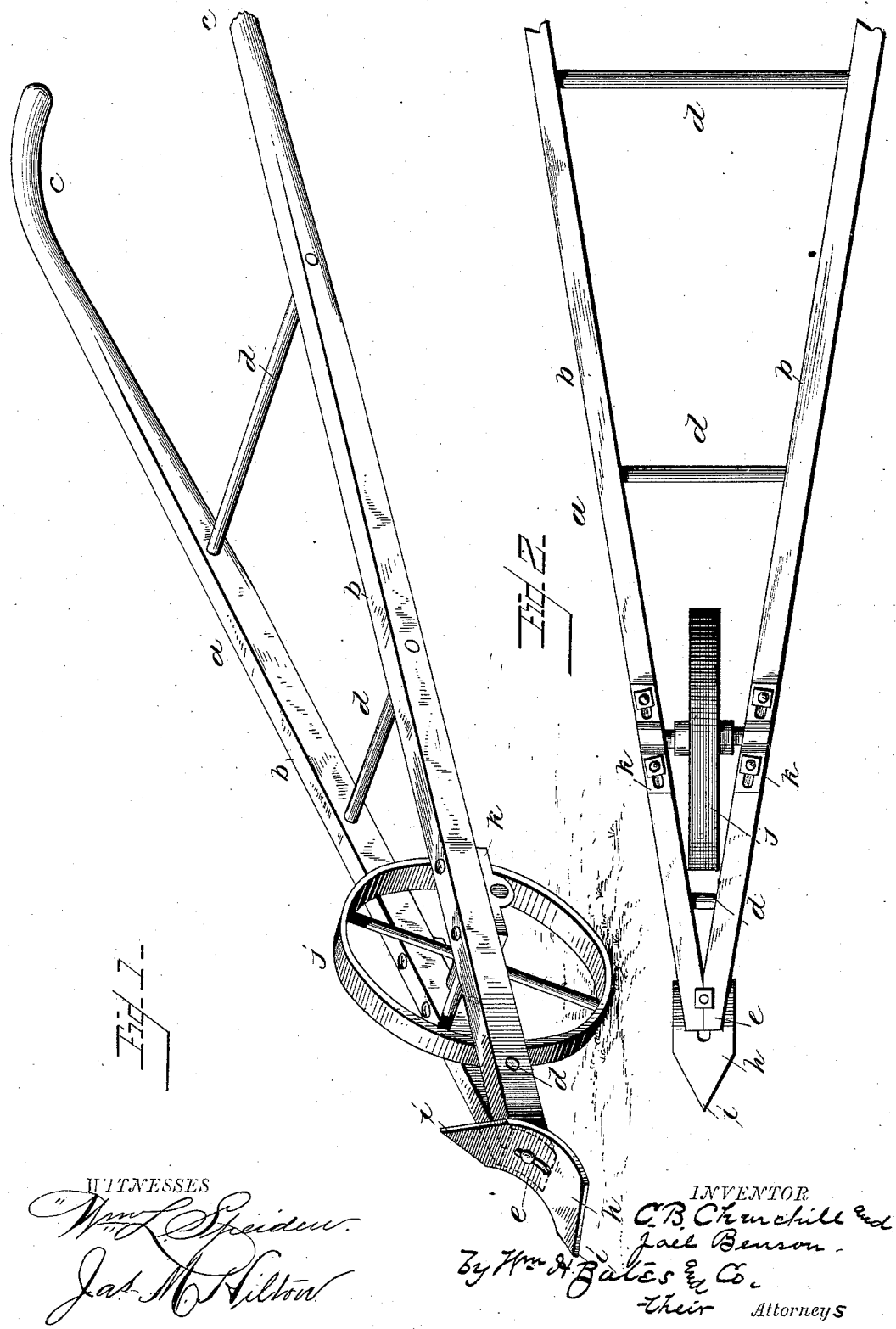

UNITED STATES PATENT OFFICE.

CYRUS B. CHURCHILL AND JOEL BENSON, OF BERRIEN SPRINGS, MICH.

GARDEN IMPLEMENT.

SPECIFICATION forming part of Letters Patent No. 306,058, dated October 7, 1884.

Application filed June 12, 1884. (No model.)

*To all whom it may concern:*

Be it known that we, CYRUS B. CHURCHILL and JOEL BENSON, both citizens of the United States, residing at Berrien Springs, in the county of Berrien and State of Michigan, have invented certain new and useful Improvements in Garden Implements, of which the following is a specification, reference being had therein to the accompanying drawings.

This invention has relation to improvements in that class of devices known as "garden implements;" and it consists in the construction and arrangement of the various parts of which it is composed, all as will be hereinafter more fully explained, and particularly pointed out in the claim appended.

The annexed drawings, to which reference is made, fully illustrate our invention, in which Figure 1 represents a perspective view of our device, and Fig. 2 is a bottom view of the same.

Referring by letter to the accompanying drawings, $a$ designates the garden implement or hand-plow, which consists of the two bars $b\ b$, that terminate at their ends in handles $c\ c$, by means of which the operator forces the implement forward in plowing. These side bars are connected to one another by transverse rounds or bars $d\ d\ d$, and said bars converge to their forward end, and terminate in curved point $e\ e$ of the handle-bars aforesaid. This curved end of the implement serves as a seat or bearing for the plow-point $h$, which latter is bolted thereto, which point is also curved to correspond with said seat or bearing, and can be adjusted vertically to suit the plow to the different heights of persons. When adjusted to bring the lower point near the wheel said plow-handles have a higher elevation, and when adjusted to throw said point from the wheel the handles are thereby lowered; and it is constructed with double points, as at $i\ i$, whereby the points can be reversed when one is worn from use, the opposite end taking its place. In rear of plow-point aforesaid is a supporting-wheel, $j$, which is arranged between the handle-bars and has its axle-end journals seated in adjustable bearings $k$ on the under side of the bars, whereby, through the medium of said adjustment, the wheel may be set near or away from the point $h$, thereby readily adjusting the handles to suit the height of different persons in using the implement in plowing. It will thus be seen by the above description and by reference to the annexed drawings that the ends of the handle-bars afford a broad and strong bearing for the plow-point, and by providing a double point the same can be reversed and either point used; and, if desirable, one of said points may be narrow, while the opposite end may form a shovel or broad point, which could be used for various purposes, such as grading, &c.; and, furthermore, it will be observed that we provide means whereby the device may be used conveniently by tall and short persons, which is simply accomplished by moving the wheel near or from the plow-point in its adjustable bearing, and also adjustment is accomplished by adjusting the plow-points, as above described, and when properly set the same are made fast by the fastening screws or bolts.

In setting the wheel for a short or small person to use, said wheel should be set back from the plow-point, and for a tall person the same should be set near said point, and it is simple in operation, durable, and at the same time cheap to manufacture.

Having described our invention, what we claim, and desire to secure by Letters Patent, is—

The improved garden implement herein shown and described, consisting of the handles or bars $b\ b$, converging and meeting at their forward ends, and provided with the curved seat $e$, the curved plow-point $i$, having the central slot to receive a single bolt for securing the point, and the adjustable bearings $k\ k$, to receive the journals of the wheel $j$, the whole constructed as set forth, whereby adjustment is effected both at the plow-point and supporting-wheel.

In testimony whereof we affix our signatures in presence of two witnesses.

CYRUS B. CHURCHILL.
JOEL BENSON.

Witnesses:
ROBERT MCCOMBE,
BENJAMIN F. PENNELL.